(12) United States Patent
Suewaka

(10) Patent No.: US 12,258,675 B2
(45) Date of Patent: Mar. 25, 2025

(54) METHOD OF PRODUCING A SILICON SINGLE CRYSTAL BASED ON CONCENTRATION PROFILES OF VACANCIES AND INTERSTITIAL SILICON ATOMS DURING PULLING OF A SILICON SINGLE CRYSTAL BY THE CZOCHRALSKI PROCESS

(71) Applicant: SUMCO CORPORATION, Tokyo (JP)

(72) Inventor: Ryota Suewaka, Tokyo (JP)

(73) Assignee: SUMCO CORPORATION, Tokyo (JP)

(*) Notice: Subject to any disclaimer, the term of this patent is extended or adjusted under 35 U.S.C. 154(b) by 318 days.

(21) Appl. No.: 17/772,895

(22) PCT Filed: Aug. 12, 2020

(86) PCT No.: PCT/JP2020/030726
§ 371 (c)(1),
(2) Date: Apr. 28, 2022

(87) PCT Pub. No.: WO2021/084843
PCT Pub. Date: May 6, 2021

(65) Prior Publication Data
US 2022/0364260 A1 Nov. 17, 2022

(30) Foreign Application Priority Data
Oct. 29, 2019 (JP) .................................. 2019-196678

(51) Int. Cl.
*C30B 15/20* (2006.01)
*C30B 29/06* (2006.01)
(Continued)

(52) U.S. Cl.
CPC .............. *C30B 15/20* (2013.01); *C30B 29/06* (2013.01); *G06F 30/20* (2020.01); *G06F 2111/10* (2020.01)

(58) Field of Classification Search
CPC ......... C30B 15/00; C30B 15/20; C30B 29/00; C30B 29/02; C30B 29/06; C30B 35/00; G06F 30/20; G06F 2111/10
(Continued)

(56) References Cited

U.S. PATENT DOCUMENTS

2008/0187736 A1 8/2008 Sattler et al.
2009/0301385 A1 12/2009 Kuroki et al.
2019/0330760 A1 10/2019 Suewaka

FOREIGN PATENT DOCUMENTS

JP 2006-306640 A 11/2006
JP 2008-189544 A 8/2008
(Continued)

OTHER PUBLICATIONS

Voronkov, "The Mechanism of Swirl Defects Formation in Silicon", Journal of Crystal Growth, 59, Mar. 1, 1982, pp. 625-643.
(Continued)

*Primary Examiner* — Kenneth A Bratland, Jr.
(74) *Attorney, Agent, or Firm* — GREENBLUM & BERNSTEIN, P.L.C.

(57) ABSTRACT

Provided is a point detect simulator which makes it possible to determine the distribution of point defects in a silicon single crystal in consideration of the thermal stress of the silicon single crystal being grown. A point defect simulator 1 is a point defect simulator calculating the concentration profiles of vacancies and interstitial silicon during pulling of a silicon single crystal using a convection-diffusion equation reflecting the consideration of thermal stress in the silicon single crystal, and includes an analysis unit used to fit calculation results to experimental results using stress coefficients that are the coefficients of stress terms as a fitting parameter.

6 Claims, 6 Drawing Sheets

(51) Int. Cl.
*G06F 30/20* (2020.01)
*G06F 111/10* (2020.01)

(58) Field of Classification Search
USPC ...... 117/11, 13–15, 200–202, 206, 208, 928, 117/931–932
See application file for complete search history.

(56) References Cited

FOREIGN PATENT DOCUMENTS

| | | | |
|---|---|---|---|
| JP | 2015036352 A | * | 2/2015 |
| JP | 2015-107897 A | | 6/2015 |
| JP | 2016-013957 A | | 1/2016 |
| KR | 10-2004-0084728 A | | 10/2004 |
| WO | 2015/083327 A1 | | 6/2015 |
| WO | 2018/128046 A1 | | 7/2018 |
| WO | 2020/039553 A1 | | 2/2020 |

OTHER PUBLICATIONS

Vanhellemont, "Intrinsic point defect incorporation in silicon single crystals grown from a melt, revisited", Journal of Applied Physics, 110, Sep. 23, 2011, pp. 063519-1-063519-16.
Nakamura et al., "Experimental Study of the Impact of Stress on the Point Defect Incorporation during Silicon Growth", ECS Solid State Letters, 3, Jan. 3, 2014, pp. N5-N7.
Sueoka et al., "A study on density functional theory of the effect of pressure on the formation and migration enthalpies of intrinsic point defects in growing single crystal Si", Journal of Applied Physics, 111, May 10, 2012, pp. 093529-1-093529-9.
ISR for PCT/JP2020/030726, dated Oct. 6, 2020 (w/ translation).
IPRP for PCT/JP2020/030726, dated May 3, 2022 (w/ translation).
Office Action for DE App. No. 11 2020 005 217.6, dated Dec. 4, 2023 (w/ translation).
Office Action for KR App. No. 10-2022-7010095, dated Dec. 14, 2023 (w/ translation).
Office Action for DE App. No. 11 2020 005 217.6, dated Apr. 8, 2024 (w/ translation).

* cited by examiner

METHOD OF PRODUCING A SILICON SINGLE CRYSTAL BASED ON CONCENTRATION PROFILES OF VACANCIES AND INTERSTITIAL SILICON ATOMS DURING PULLING OF A SILICON SINGLE CRYSTAL BY THE CZOCHRALSKI PROCESS

TECHNICAL FIELD

This disclosure relates to a point defect simulator, a point defect simulation program, a point defect simulation method, a method of producing silicon single crystal, and a single crystal pulling apparatus.

BACKGROUND

Conventionally, silicon wafers are used as substrates for semiconductor devices. A silicon wafer can be obtained for example by subjecting a single crystal silicon ingot (hereinafter may simply be referred to as "crystal") grown by the Czochralski (CZ) process to a wafer processing process.

In recent years, as semiconductor devices are further miniaturized and integrated, silicon wafers serving as substrates are required to be free of grown-in defects, that is, to be defect free. Grown-in defects refer to void defects formed by aggregation of vacancies, interstitial dislocation clusters formed by precipitation of interstitial silicon atoms, etc. and would remain in a silicon wafer produced, resulting in the deterioration of a gate oxide film or leakage currents in a semiconductor device.

The behavior of vacancies and interstitial silicon atoms in a crystal is explained by the Voronkov's model. Specifically, when the value of the ratio v/G of the pulling speed v of the crystal to the temperature gradient G in the pulling direction of a single crystal silicon ingot near the solid-liquid interface is larger than the critical value (hereinafter may also be referred to as "critical v/G"), vacancies are predominant; and when the value is smaller than the critical v/G, interstitial silicon atoms is predominant (see for example, V. V. Voronkov, J. Crystal Growth, 59, 625 (1982) (NPL 1)).

When the value of v/G is the critical v/G, a defect-free crystal can be obtained. In general, the range (margin) of the pulling speed v corresponding to the critical v/G is significantly narrow, and is necessarily controlled to for example the critical v/G±2%.

In recent years, it has been suggested that the thermal stress in a crystal near the solid-liquid interface influences the distribution of vacancies V and interstitial silicon atoms I in the crystal, and consequently the value of the critical v/G (see for example, J. Vanhellemont, J. Appl. Phys., 110, 063519 (2011) (NPL 2)). Since it is believed that increase in the diameter of crystals will further increase the thermal stress in the crystals in the future, it is very important to evaluate the effect of the thermal stress described above on the behavior of point defects such as vacancies and interstitial silicon atoms.

Against this backdrop, K. Sueoka, E. Kamiyama, and H. Kariyazaki, J. Appl. Phys., 111, 093529 (2012) (NPL 3) reports that a first principles calculation based on the density functional theory has suggested that the compressive stress in a crystal near the solid-liquid interface increases the concentration of vacancies and consequently reduces the value of the critical v/G. Further, K. Nakamura, R. Suewaka, B. Ko, ECS Solid State Letters, 3, N5 (2014) (NPL 4) presents experimental evidence of reduction in the value of the critical v/G due to the compressive stress of a crystal near the solid-liquid interface.

CITATION LIST

Non-Patent Literature

NPL 1: V. V. Voronkov, J. Crystal Growth, 59, 625 (1982)
NPL 2: J. Vanhellemont, J. Appl. Phys., 110, 063519 (2011)
NPL 3: K. Sueoka, E. Kamiyama, and H. Kariyazaki, J. Appl. Phys., 111, 093529 (2012)
NPL 4: K. Nakamura, R. Suewaka, B. Ko, ECS Solid State Letters, 3, N5 (2014)

SUMMARY

Technical Problem

NPLs 3 and 4 above describe that the stress in a crystal affects the value of the critical v/G; however, in those documents, the distribution of point defects including vacancies and interstitial silicon atoms is not determined in consideration of the stress in the crystal.

It could therefore be helpful to provide a point defect simulator, a point defect simulation program, a point defect simulation method, a method of producing a silicon single crystal, and a single crystal puling apparatus which make it possible to determine the distribution of point defects in a silicon single crystal in consideration of the thermal stress in the silicon single crystal being grown.

Solution to Problem

We propose the following features to address the above challenge.

<1> A point defect simulator calculating concentration profiles of vacancies and interstitial silicon atoms during pulling of a silicon single crystal by the Czochralski process using a convection-diffusion equation, wherein
  the convection-diffusion equation has a concentration $C_V^{eq}$ of vacancies in thermal equilibrium represented by an equation (A) shown below and a concentration $C_I^{eq}$ of interstitial silicon atoms in thermal equilibrium represented by an equation (B) shown below,
  the point defect simulator comprising:
  an analysis unit used to fit calculation results to experimental results using as a fitting parameter, one of a first stress coefficient $a_V^f$ in the equation (A) and a second stress coefficient $a_I^f$ in the equation (B), $$C_V^{eq}(T,P) = C_{0,V} \exp\left(-\frac{E_V^f + a_V^f P}{k_B T}\right) \text{ and} \quad (A)$$

$$C_I^{eq}(T,P) = C_{0,I} \exp\left(-\frac{E_I^f + a_I^f P}{k_B T}\right), \quad (B)$$

wherein in the equations (A) and (B), T is a temperature, P is a stress, $C_{0,V}$ and $C_{0,I}$ are constants, $k_B$ is the Boltzmann constant, $E_V^f$ is a formation energy of a vacancy, and $E_I^f$ is a formation energy of an interstitial silicon atom.
<2> The point defect simulator according to <1> above, wherein a solid-liquid interface between the silicon single crystal and a silicon melt has an upward convex shape.

<3> The point defect simulator according to <1> or <2> above, wherein the silicon single crystal has a diameter of 300 mm or more.

<4> A point defect simulation program for making a computer to serve as the point defect simulator according to any one of <1> to <3> above.

<5> A point defect simulation method used to determine concentration profiles of vacancies and interstitial silicon atoms in a silicon single crystal using the point defect simulator according to any one of <1> to <3> above.

<6> The point defect simulation method according to <5> above, wherein the solid-liquid interface between the silicon single crystal and the silicon melt has an upward convex shape.

<7> The point defect simulation method according to <5> or <6> above, wherein the silicon single crystal has a diameter of 300 mm or more.

<8> A method of producing a silicon single crystal, the method comprising: for at least one single crystal pulling apparatus, determining concentration profiles of point defects including vacancies and interstitial silicon atoms in a silicon single crystal pulled up using the single crystal pulling apparatus using one of the point defect simulator according to any one of <1> to <3> above and the point defect simulation method according to any one of <5> to <7> above; designing the single crystal pulling apparatus based on the determined concentration profiles of vacancies and interstitial silicon atoms; and producing a defect-free silicon single crystal using the designed single crystal pulling apparatus.

<9> A single crystal pulling apparatus designed by determining concentration profiles of point defects including vacancies and interstitial silicon atoms in a silicon single crystal using one of the point defect simulator according to any one of <1> to <3> above and the point defect simulation method according to any one of <5> to <7> above, and designing the single crystal pulling apparatus based on the determined concentration profiles of vacancies and interstitial silicon atoms.

Advantageous Effect

This disclosure can provide determining the distribution of point defects in a silicon single crystal in consideration of the thermal stress of the silicon single crystal being grown.

DETAILED DESCRIPTION (Point Defect Simulator)

Figure 1:
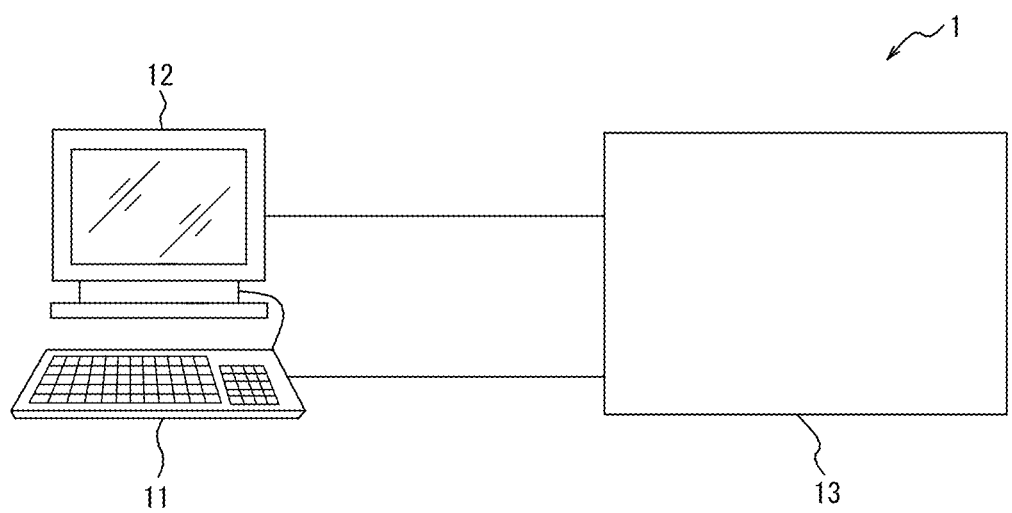
FIG. 1 is a diagram illustrating an example of a point defect simulator of this disclosure.

Embodiments of this disclosure will now be described with reference to the drawings. FIG. 1 is a schematic diagram illustrating an example of a point defect simulator according to this disclosure. The point defect simulator 1 depicted in FIG. 1 includes an input unit 11, a display unit 12, and an analysis unit 13.

The input unit 11 is an input interface for manipulating the point defect simulator 1 of this disclosure, and can be composed of, for example, a keyboard, a pen tablet, a touchpad, a mouse, etc. The input unit 11 may be a touch panel integrated with a display unit 12 to be described.

The display unit 12 is a device for displaying outputs such as simulation results, and may be constituted by a given display, for example, a liquid crystal display or an organic light-emitting diode (OLED) display.

The analysis unit 13 is a device used to calculate the concentration profiles of vacancies and interstitial silicon atoms during pulling of a silicon single crystal by the CZ process. In this disclosure, the analysis unit 13 is used to determine the concentration profiles of vacancies and interstitial silicon atoms based on the Voronkov's model.

The convection-diffusion equations of vacancies and interstitial silicon atoms based on the Voronkov's model can be represented by the following equations (1) and (2), respectively:

$$\frac{\partial C_V}{\partial t} = -\nabla J_V - v\left(\frac{\partial C_V}{\partial z}\right) - K_{VI}(C_V C_I - C_V^{eq} C_I^{eq}) \text{ and} \quad (1)$$

$$\frac{\partial C_I}{\partial t} = -\nabla J_I - v\left(\frac{\partial C_I}{\partial z}\right) - K_{VI}(C_V C_I - C_V^{eq} C_I^{eq}). \quad (2)$$

In the right-hand side of the above equation (1) (equation (2)), the first term is a diffusion term describing the diffusion effect of the concentration gradient of vacancies (interstitial silicon atoms), the second term is an advective term by the growth of a crystal, and the third term is a pair annihilation term involving the reaction between vacancies and interstitial silicon atoms. Further, $C_V$ is a concentration of vacancies, $C_I$ is a concentration of interstitial silicon atoms, t is a time period, $J_v$ is a diffusion flux of vacancies, $J_I$ is a diffusion flux of interstitial silicon atoms, v is the growth rate of the silicon single crystal (pulling rate), $K_{VI}$ is the reaction coefficient of the pair annihilation between vacancies and interstitial silicon atoms, $C_V^{eq}$ is the concentration of vacancies in thermal equilibrium, and $C_I^{eq}$ is the concentration of interstitial silicon atoms in thermal equilibrium.

Further, the diffusion flux $J_V$ in the equation (1) and the diffusion flux $J_I$ in the equation (2) can be represented by equations (3) and (4), respectively:

$$J_V = -D_V \nabla C_V - \frac{D_V C_V Q_V}{k_B T^2} \nabla T \text{ and} \quad (3)$$

$$J_I = -D_I \nabla C_I - \frac{D_I C_I Q_I}{k_B T^2} \nabla T, \quad (4)$$

where $D_V$ is a diffusion coefficient of vacancies, $D_I$ is a diffusion coefficient of interstitial silicon atoms, $Q_V$ is the reduced heat transport of vacancies, and $Q_I$ is the reduced heat transport of interstitial silicon atoms, which is defined as the heat flux per unit flux of a component atom in the absence of a temperature gradient. Meanwhile, T is an absolute temperature, and $k_B$ is the Boltzmann constant. The above equations (3) and (4) describe the effect of the temperature gradient on diffusion.

Further, the reaction coefficient $K_{VI}$ in the equations (1) and (2) can be represented by an equation (5):

$$K_{VI} = 4\pi a_C (D_V + D_I) \exp\left(-\frac{\Delta G_{IV}}{k_B T}\right), \quad (5)$$

where $a_C$ is the critical distance between vacancies and interstitial silicon atoms, in which the pair annihilation reaction can occur (=0.543 nm), $\Delta G_{IV}$ is the barrier energy for annihilation, found by Sinno et. al. (see for example, J. Electrochem. Soc. 145 (1998) 302).

Here, the concentration $C_V^{eq}$ of vacancies in thermal equilibrium and the concentration $C_I^{eq}$ of interstitial silicon atoms in thermal equilibrium are conventionally determined using equations (6') and (7'):

$$C_V^{eq}(T, P) = C_{0,V} \exp\left(-\frac{H_V^f}{k_B T}\right) = C_{0,V} \exp\left(-\frac{E_V^f}{k_B T}\right) \text{ and} \quad (6')$$

$$C_I^{eq}(T, P) = C_{0,I} \exp\left(-\frac{H_I^f}{k_B T}\right) = C_{0,I} \exp\left(-\frac{E_I^f}{k_B T}\right), \quad (7')$$

where $C_{0,V}$ and $C_{0,I}$ are constants, $H_V^f$ is a formation enthalpy of a vacancy, $E_V^f$ is a formation energy of a vacancy, $H_I^f$ is a formation enthalpy of an interstitial silicon atom, and $E_I^f$ is a formation energy of an interstitial silicon atom.

As described above, the thermal stress in a crystal near the solid-liquid interface was found to have an effect on the distribution of vacancies and interstitial silicon atoms. However, the effect of the above thermal stress is not taken into consideration for the above equations (6') and (7'). Accordingly, in this disclosure, the concentration $C_V^{eq}$ of vacancies in thermal equilibrium and the concentration $C_I^{eq}$ of interstitial silicon atoms in thermal equilibrium are determined using equations (6) and (7):

$$C_V^{eq}(T, P) = C_{0,V} \exp\left(-\frac{E_V^f + a_V^f P}{k_B T}\right) \text{ and} \quad (6)$$

$$C_I^{eq}(T, P) = C_{0,I} \exp\left(-\frac{E_I^f + a_I^f P}{k_B T}\right), \quad (7)$$

where P is the stress in a crystal, which represents a tensile stress when the value is positive, and represents a compressive stress when the value is negative. Further, $a_V^f$ and $a_I^f$ are stress coefficients.

Conventionally, the diffusion coefficient $D_V$ of vacancies and the diffusion coefficient $D_I$ of interstitial silicon atoms above are determined using for example, equations (8') and (9') (see for example, K. Nakamura, "Research on point defect diffusion and secondary defect formation in silicon single crystal growth process", Doctoral dissertation, Tohoku University, 2001 (Japanese)):

$$D_V(T, P) = D_{0,V} \exp\left(-\frac{E_V^m}{k_B T}\right) \text{ and} \quad (8')$$

$$D_I(T, P) = D_{0,I} \exp\left(-\frac{E_I^m}{k_B T}\right), \quad (9')$$

where $D_{0,V}$ and $D_{0,I}$ are constants, $E_V^m$ is a diffusion activation energy of a vacancy, $E_I^m$ is a diffusion activation energy of a interstitial silicon atom.

Also for the above equations (8') and (9'), the effect of the thermal stress is not taken into consideration as in the above equations (6') and (7'). The effect of the thermal stress is taken into consideration by rearranging the above equations (8') and (9') to equations (8) and (9):

$$D_V(T, P) = D_{0,V} \exp\left(-\frac{E_V^m + a_V^m P}{k_B T}\right) \text{ and} \quad (8)$$

$$D_I(T, P) = D_{0,I} \exp\left(-\frac{E_I^m + a_I^m P}{k_B T}\right), \quad (9)$$

where $a_V^m$ and $a_I^m$ are stress coefficients.

The above equations (6) to (9) include new variable stress coefficients $a_V^f$, $a_I^f$, $a_V^m$, and $a_I^m$, and aim to describe the effect of the thermal stress. Accordingly, the values of the above four stress coefficients $a_V^f$, $a_I^f$, $a_V^m$, and $a_I^m$ are required to be determined by solving the convection-diffusion equations (1) and (2) to find the concentration profiles of vacancies and interstitial silicon atoms in the silicon single crystal. However, these values cannot be uniquely determined by comparison with for example experimental results.

The inventor of this disclosure diligently studied ways to determine the above four stress coefficients $a_V^f$, $a_I^f$, $a_V^m$, and $a_I^m$. As a result, he found that the concentration profiles of vacancies and interstitial silicon atoms in a silicon single crystal can be found by determining $a_V^f - a_I^f$ such that the defect distribution obtained from experiments can be well reproduced by the defect distribution obtained by simulations using $a_V^m$ and $a_I^m$ as constants (for example, zero) and $a_V^f - a_I^f$ as a fitting parameter. The background of this finding is described below.

First, the critical v/G (P)=$\xi_{cri}$ (P) mentioned above is represented by an equation (10):

$$\xi_{cri}(P) = \frac{D_I(T_{mp}, P) C_I^{eq}(T_{mp}, P)(H + Q_I) - D_V(T_{mp}, P) C_V^{eq}(T_{mp}, P)(H + Q_V)}{k_B T_{mp}^2 (C_V^{eq}(T_{mp}) - C_I^{eq}(T_{mp}))}, \quad (10)$$

where $T_{mp}$ is the melting point of silicon (1685K), H is the average of the formation enthalpy $H_V^f$ of a vacancy and the formation enthalpy $H_I^f$ of an interstitial silicon atom as described by an equation (11):

$$H = \frac{H_V^f + H_I^f}{2}, \quad (11)$$

where the formation enthalpy $H_V^f$ of a vacancy and the formation enthalpy $H_I^f$ of an interstitial silicon atom are determined in accordance with equations (12) and (13):

$$H_V^f = E_V + a_V^f P \quad (12) \text{ and}$$

$$H_I^f = E_I + a_I^f P \quad (13).$$

The change in $\iota_{cri}$ (P) above represents a change of the behavior of point defects introduced due to the effect of thermal stress, and the effect of the thermal stress on the behavior of the point defects can be predicted by comparing $\xi_{cri}$ (P) and $\xi_{cri}$ (0). The value of $\xi_{cri}$ (0) here is 0.163 mm$^2$/min/K.

Now, $\xi_{cri}$ is determined by the above equation (10) using the physical property values specified in NPL 4, given in Table 1 blow and the values of the stress coefficients ($a_V^f = 0.154$ meV/MPa, $a_I^f = -0.07$ meV/MPa, $a_V^m = 0.03$ meV/MPa, $a_I^m = -0.038$ meV/MPa) specified in NPL 3. The value of the stress P here is set to $-10$ MPa, which is a typical value for a crystal used as a 300 mm diameter wafer.

TABLE 1

| Physical property | Vacancy | Interstitial silicon |
|---|---|---|
| $C_0$ (cm$^{-3}$) | 3.9175 × 10$^{26}$ | 6.2303 × 10$^{26}$ |
| $E^f$ (eV) | 3.940 | 4.050 |
| $D_0$ (cm$^2$s$^{-1}$) | 3.5105 × 10$^{-4}$ | 2.4547 × 10$^{-1}$ |
| $E^m$ (eV) | 0.300 | 0.900 |
| Q (eV) | 0.000 | 1.010 |

The results of the above calculations demonstrate that the value of $\xi_{cri}$ ($-10$) is 0.163 mm$^2$/min/K when $a_V^m = 0.03$ meV/MPa, $a_I^m = -0.038$ meV/MPa (where $a_V^f = a_I^f = 0$ meV/MPa); and the value of the stress P is set to $-10$ MPa and that the value of $\xi_{cri}$ ($-10$) is equal to the value of $\xi_{cri}$ (0). This result demonstrates that the value of $\xi_{cri}$ (P) can be set to an appropriate value, for example zero in a manner independent of the values of $a_V^m$ and $a_I^m$.

Next, the inventor intensively studied how to determine the values of $a_V^f$ and $a_I^f$ with the values of $a_V^m$ and $a_I^m$ being set to zero. However, these values of $a_V^f$ and $a_I^f$ cannot be uniquely determined by comparison with for example experimental results.

This being the case, the inventor determined the value of $\xi_{cri}$ by the above equation (10) while variously setting the values of $a_V^f$ and $a_I^f$. This revealed that the same $\xi_{cri}$, that is, the same value of the critical v/G was obtained even if the absolute values of $a_V^f$ and $a_I^f$ were different when $a_V^f - a_I^f$ was fixed.

Figure 2:
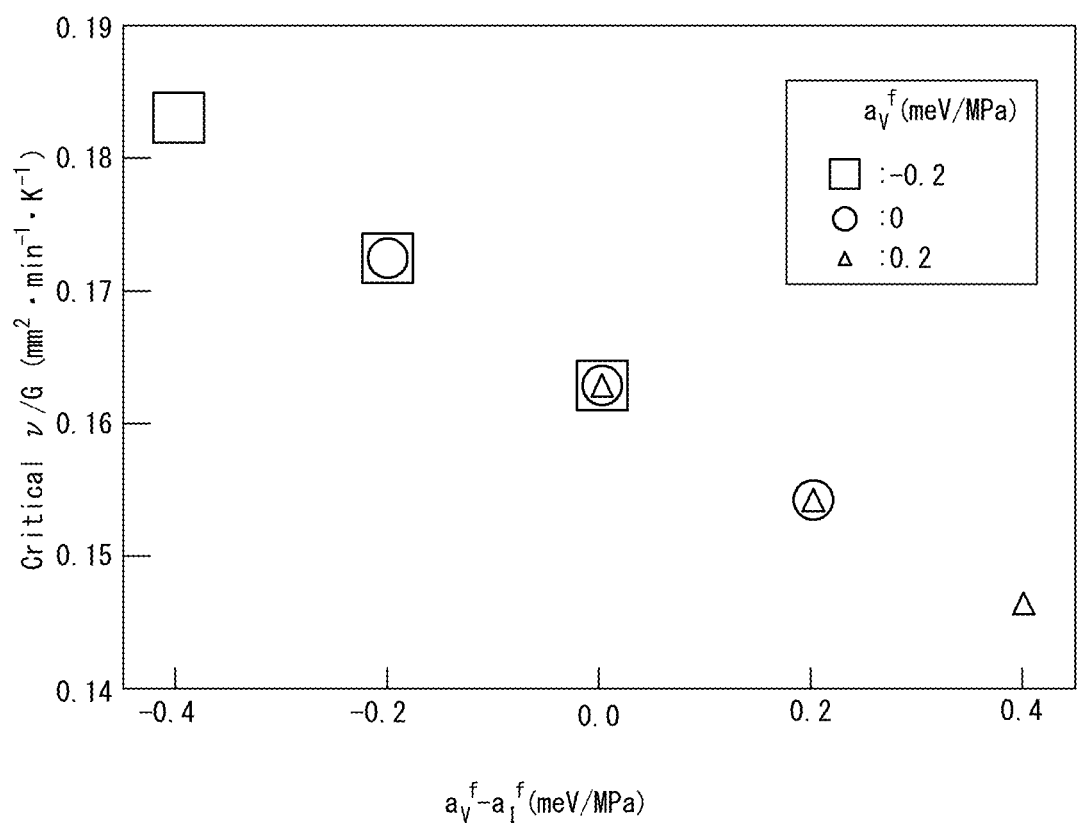
FIG. 2 is a diagram illustrating the relationship between the stress coefficient and the critical v/G.

FIG. 2 illustrates the relationship between the value of $a_V^f - a_I^f$ and the value of the critical v/G ($=\xi_{cri}$) and illustrates cases where the value of $a_V^f$ was set to $-0.2$ meV/MPa, 0 meV/MPa, and 0.2 meV/MPa. As is apparent from FIG. 2, for a certain $a_V^f - a_I^f$, the same value of the critical v/G ($=\xi_{cri}$) is obtained even if the absolute value of $a_V^f$ (and $a_I^f$) is different. This result demonstrates that the concentration profiles of vacancies and interstitial silicon atoms in a silicon single crystal can be found by determining $a_V^f - a_I^f$ such that the defect distribution obtained from experiments can be well reproduced by the defect distribution obtained by simulations using $a_V^f - a_I^f$ as a fitting parameter. Specifically, this can be performed by setting one of $a_V^f$ and $a_I^f$ as a fixed value and using the other as a fitting parameter. For example, the value of $a_I$ can be set to $-0.07$ meV/MPa determined by a first principle calculation, and $_V^f$ can be used as a fitting parameter.

In fitting using the value of $a_V^f - a_I^f$ as a fitting parameter, $\Delta C_C$ represented by the following equation (14), obtained by solving the convection-diffusion equations (1) and (2) that is the difference $\Delta C_V$ between the excessive concentration ($C_V - C_V^{eq}$) of vacancies and the excessive concentration ($C_I - C_I^{eq}$) of interstitial silicon atoms at 1273 K has been reported to correspond to the defect distribution in the crystal (see for example, T. Y. Tan et al. and U. Gosele, Appl. Phys. A37, 1 (1985).

$$\Delta C_V = (C_V - C_V^{eq}) - (C_I - C_I^{eq}) \text{ at } 1273K \quad (14)$$

Figure 3:
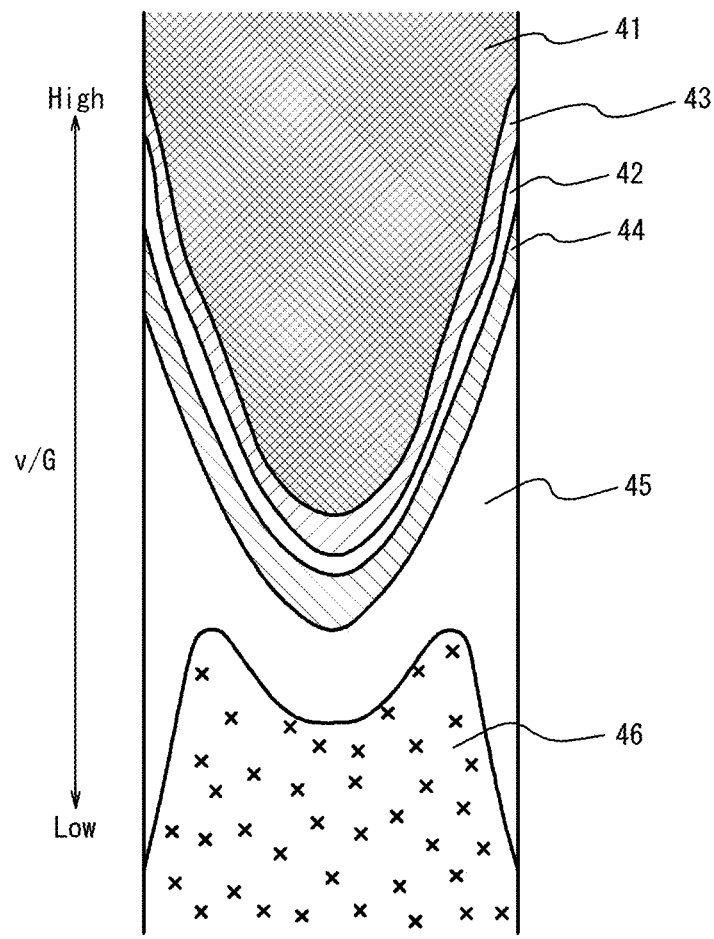
FIG. 3 is a diagram illustrating the relationship between v/G and the defect distribution.

FIG. 3 illustrates the relationship between the value of v/G and the defect distribution in a silicon single crystal, and the horizontal axis therein represents the position in the silicon single crystal in the diameter direction. As illustrated in FIG. 3, a COP formation region 41 that is a crystal region in which COPs are formed is predominant in the single crystal silicon when the value of v/G is large; and when the value of v/G is smaller, an OSF potential nuclei region 42 that appears as a ring-shaped OSF region when subjected to a certain oxidation heat treatment, an oxygen precipitation promotion region (hereinafter may also be referred to as "$P_V(1)$ region") 43 that is a crystal region where oxygen precipitation is likely to occur and COPs are not detected, and an oxygen precipitation promotion region (hereinafter may also be referred to as "$P_V(2)$ region") 44 that is a crystal region where oxygen precipitates are present and COPs are not detected are predominant.

When v/G is even smaller, an oxygen precipitation inhibition region (hereinafter may also be referred to as "$P_I$ region") 45 that is a crystal region where oxygen precipitation hardly occurs and COPs are not detected and a crystal region dislocation cluster region (hereinafter may also be referred to as "L/DL region") 46 that is a crystal region where interstitial dislocation clusters are detected are predominant.

Among silicon wafers obtained from a silicon single crystal exhibiting the defect distribution as described above depending on the value of v/G, the silicon wafers obtained from the crystal region of one of the $P_V(1)$ region 43, the $P_V(2)$ region 44, and the $P_I$ region 45 or a combination of these regions are defect-free silicon wafers without crystal defects.

As described above, $\Delta C_V$ represented by the above equation (14) has been reported to correspond to the defect distribution in a crystal; however, the position with a $\Delta C_V$ value of $-0.2129 \times 10^{13}$/cm$^3$ can form the boundary between the $P_I$ region 45 and the L/DL region 46 (see for example, K. Nakamura, "Research on point defect diffusion and secondary defect formation in silicon single crystal growth process", Doctoral dissertation, Tohoku University, 2001 (Japanese)).

Accordingly, $a_V^f - a_I^f$ is determined such that in the defect distribution in a crystal obtained by simulations, the position with $\Delta C_V = -0.2129 \times 10^{13}$/cm$^3$ with respect to the defect distribution in the crystal obtained by the simulations form the boundary between the $P_I$ region 45 and the L/DL region 46 in an experimentally obtained defect distribution. Since at least one of $a_V^f$ and $a_I^f$ can be found by an appropriate calculation approach such as a first principles calculation, the values of $a_V^f$ and $a_I^f$ can be determined Although the concentration of oxygen atoms in the silicon single crystal is not taken into consideration for $C_{0,V}$ in the above equation (1), $C_{0,V}$ can be found in consideration of the concentration of oxygen atoms as described below.

First, the concentration of vacancies in thermal equilibrium, represented by the equation (1) is represented by an equation (15) when considering the concentration of oxygen atoms:

$$C_V^{eq}(T, P, Oi) = C_{0,V,Oi} \exp\left(-\frac{H_V^f}{k_B T}\right) = C_{0,V,Oi} \exp\left(-\frac{E_V^f + a_V^f P}{k_B T}\right), \quad (15)$$

where Oi is a concentration of oxygen atoms defined in ASTM F121-1979, and $C_{0,V,Oi}$ is a constant.

Further, the effect of the concentration of oxygen atoms on the concentration of vacancies in thermal equilibrium at the melting point is represented by an equation (16):

$$C_V^{eq}(T_{mp}, P, Oi) = C_V^{eq}(T_{mp}, P, 0) + aOi \quad (16),$$

where $C_V^{eq}(T_{mp}, P, 0)$ is a concentration of vacancies in thermal equilibrium when the concentration of oxygen atoms is zero, and a is a constant (for example, $4 \times 10^{-12}$).

The following equation (17) holds from the above equations (15) and (16).

$$C_{0,V,Oi} \exp\left(-\frac{E_V^f + a_V^f P}{k_B T_{mp}}\right) = C_{0,V} \exp\left(-\frac{E_V^f + a_V^f P}{k_B T_{mp}}\right) + aOi \quad (17)$$

Using the above equation (17), $C_{0,V}$ is represented by an equation (18):

$$C_{0,V} = C_{0,V,Oi} - aOi \cdot \exp\left(\frac{E_V^f + a_V^f P}{k_B T_{mp}}\right). \quad (18)$$

Using the equation (18) obtained as describe above, the value of $C_{0,V}$ reflecting the consideration of the concentration Oi of oxygen atoms can be obtained. This allows for performing fitting of $a_v^f$ using different experimental results and can provide generality to the analysis. Further, a point defect simulator of this disclosure can reproduce the experimentally obtained shape of the boundary between the $P_I$ region 45 and the L/DL region 46 without using the above equation (18); however, as described in Examples below, the position in the crystal pulling direction may differ from that obtained experimentally. Using the above equation (18) also allows for the coincidence of the position in the crystal pulling direction.

Further, the point defect simulator of this disclosure can preferably determine the concentration profiles of vacancies and interstitial silicon atoms in the crystal with higher precision when the solid-liquid interface between the silicon single crystal and the silicon melt has an upward convex shape.

Further, the point defect simulator of this disclosure makes it possible to determine the concentration profiles of vacancies and interstitial silicon atoms in the crystal with higher precision when the diameter of the silicon single crystal is 300 mm or more. When the diameter of a silicon single crystal is larger, the temperature difference between the inside and the outside of the crystal is larger, and the thermal stress in the crystal is higher. Accordingly, the concentration profiles of vacancies and interstitial silicon atoms in the crystal can be determined with higher precision when the diameter of the silicon single crystal is as large as 300 mm or more.

Thus, in finding the concentration profiles of vacancies and interstitial silicon atoms in a crystal based on the above convection-diffusion equations (1) and (2), the concentration profiles of vacancies and interstitial silicon atoms in the crystal can be determined using the stress coefficients $a_v^f$ or $a_i^f$ in the above equations (6) and (7) as a fitting parameter for an experimentally obtained defect distribution.

(Point Defect Simulation Program)

The point defect simulation program of this disclosure is a program for making a computer to work as the above-described point defect simulator of this disclosure. This program can be stored in a storage unit of the computer and a CPU in the computer can read from the storage unit the program containing processing instructions for performing the processing instructions, thus each step can be performed.

Further, the program containing processing instructions can be distributed for example by selling, transferring, or lending portable media such as Blu-ray (a registered trademark in Japan, other countries, or both) discs, DVDs, and CD-ROMs; or for example by storing such a program in a storage of a server on a network and transferring the program to other computers from the server via the network.

Further, a computer that executes such a program can temporarily store in its storage, for example a program stored in a portable medium or a program transferred from a server. In another embodiment of this program, a computer may directly read the program from a portable medium and execute processing in accordance with the program; alternatively, each time the program is transferred from a server to the computer, the computer may sequentially execute processing in accordance with the received program.

(Point Defect Simulation Method)

A point defect simulation method of this disclosure is used to determine the concentration profiles of vacancies and interstitial silicon atoms in a silicon single crystal using the above-described point defect simulator of this disclosure. This makes it possible to determine the distribution of point defects in consideration of the thermal stress in the silicon single crystal.

As described above, the solid-liquid interface between the silicon single crystal and the silicon melt preferably has an upward concave shape, and the diameter of the silicon single crystal is preferably 300 mm or more.

(Method of Producing Silicon Single Crystal)

A method of producing a silicon single crystal of this disclosure includes: for at least one single crystal pulling apparatus, determining the concentration profile of point defects including vacancies and interstitial silicon atoms in a silicon single crystal pulled up using the single crystal pulling apparatus using the above-described point defect simulator of this disclosure or the above-described point defect simulation method of this disclosure; designing the single crystal pulling apparatus based on the determined concentration profiles of vacancies and interstitial silicon atoms; and producing a defect-free silicon single crystal using the designed single crystal pulling apparatus.

The concentration profiles of point defects in a silicon single crystal pulled up using a predetermined single crystal pulling apparatus can be determined using the above point defect simulator of this disclosure or the above point defect simulation method of this disclosure. Thus, the pulling conditions under which a defect-free silicon single crystal can be obtained can be found.

It should be noted that when the pulling conditions under which a defect-free silicon single crystal can be obtained cannot be found from the obtained concentration profiles of point defects, changing of the design of the single crystal pulling apparatus and calculations of the concentration profiles of the point defects may be repeated until the conditions under which a defect-free silicon single crystal can be obtained are found.

"Designing the single crystal pulling apparatus" above means designing all or some of the structures in the single crystal pulling apparatus that influences mainly the thermal environment of the silicon single crystal being pulled up. The structures in the single crystal pulling apparatus include a heat shield and a water cooling means that surround the silicon single crystal being pulled up, a heater, a crucible, a heat insulating member placed around and under the heater, and the silicon melt in the crucible. Accordingly, the "designing the single crystal puling apparatus" is to determine the size, shape, material, and the relative positions of all or some of those structures. Further, the point defect simulator of this disclosure can also be used for the design of the shape of the chamber of the single crystal pulling apparatus that influences the thermal environment of the silicon single crystal and for the setting of the radiation factor in addition to the design of the structures in the single crystal pulling apparatus.

Thus, a defect-free silicon single crystal can be produced by pulling a silicon single crystal under pulling conditions under which a defect-free silicon single crystal can be obtained, using a single crystal pulling apparatus for which such conditions have been found.

(Single Crystal Pulling Apparatus)

A single crystal pulling apparatus of this disclosure is a single crystal pulling apparatus designed by determining the concentration profiles of point defects including vacancies and interstitial silicon atoms in a silicon single crystal using the above-described point defect simulator of this disclosure or the point defect simulation method of this disclosure and designing the single crystal pulling apparatus based on the determined concentration profiles of vacancies and interstitial silicon atoms.

For example, to obtain a defect-free silicon single crystal, for a single crystal pulling apparatus having a predetermined structure, the concentration profiles of point defects in a silicon single crystal are determined using the above-described point defect simulator of this disclosure or the point defect simulation method of this disclosure; and when a defect-free silicon single crystal is found to be obtainable from the determined concentration profiles of the point defects, the single crystal pulling apparatus having the above predetermined structure is included in single crystal pulling apparatuses according to this disclosure.

A single crystal pulling apparatus of this disclosure is not limited to an apparatus which makes it possible to obtain a defect-free silicon single crystal as in the above example, and may be an apparatus which makes it possible to obtain a silicon single crystal constituted by a crystal of a certain defect region (for example, the COP formation region).

EXAMPLES

Examples will now be described in detail; however, this disclosure is not limited to Examples.

(Producing Silicon Single Crystal)

A silicon single crystal (oxidation concentration: 10 atoms/cm$^3$ to 15×10$^{17}$ atoms/cm$^3$) for a 300 mm diameter wafer was produced by the CZ process. For specific pulling conditions, while a transverse magnetic field was applied, as the single crystal was pulled up, the crystal growth rate was gradually reduced. The silicon single crystal obtained was cut in the pulling direction, and after performing Cu decoration at 750° C. for 5 min, Wright etching which is selective etching was performed. The defect distribution in the crystal was found by locating each defect region under a microscope. The defect distribution obtained is illustrated in FIG. 4A.

Example

Using a point defect simulator of this disclosure, the concentration profiles of vacancies and interstitial silicon atoms in a silicon single crystal for a 300 mm diameter wafer were determined, the silicon single crystal being pulled up under the same conditions as in the production of the above silicon single crystal. In this connection, while the values of $a_V^m$ in the equation (8) and aim in the equation (9) were set to zero, the value of $a_I^f$ in the equation (7) was set to −0.07 meV/MPa, and $a_V^f$ therein was used as a fitting parameter for the defect distribution experimentally obtained, given in FIG. 4A. The positions where the value of $\Delta C_V$ given in the equation (14) then was −0.2129×10$^{13}$ cm$^{−3}$ would change depending on the value of $a_V^f$ as illustrated in FIG. 5B. While $C_{0,V}$ given in Table 1 was determined without considering the stress, the stress was taken into consideration for the equation (6), and thus the difference would have been caused because the stress was treated differently.

Figure 4A:
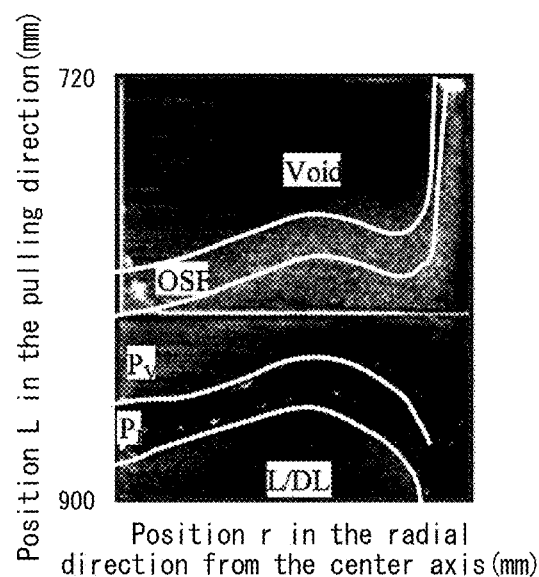
FIG. 4A is a diagram illustrating the distribution of defects in a crystal obtained through experiments.
Figure 4D:
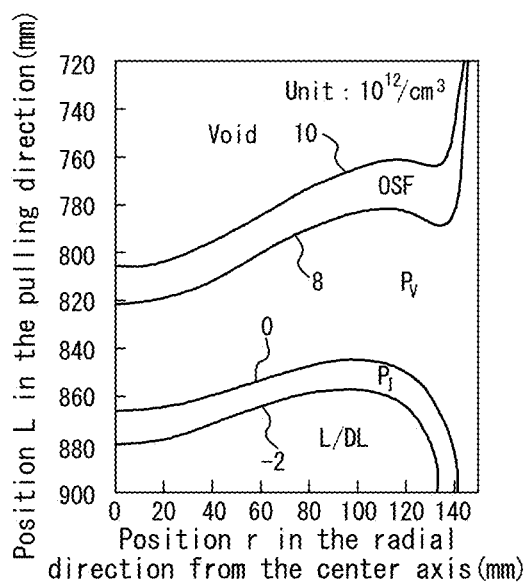
FIG. 4D is a diagram illustrating the distribution of defects in a crystal according to Example.
Figure 5A:
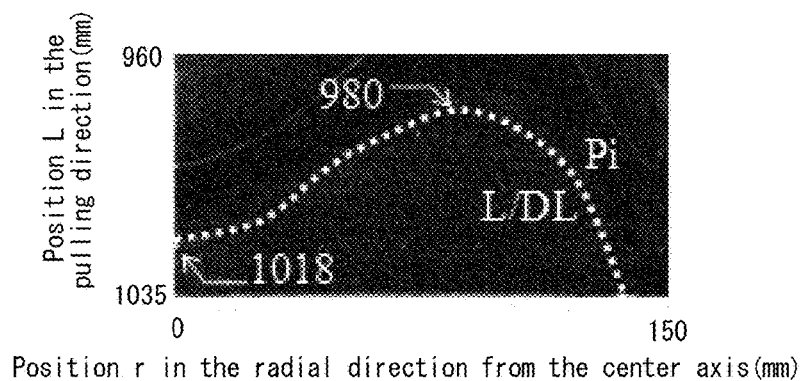
FIG. 5A is a diagram illustrating the position of the boundary between a $P_I$ region and an L/DL region in the defect distribution given in FIG. 4A.
Figure 5B:
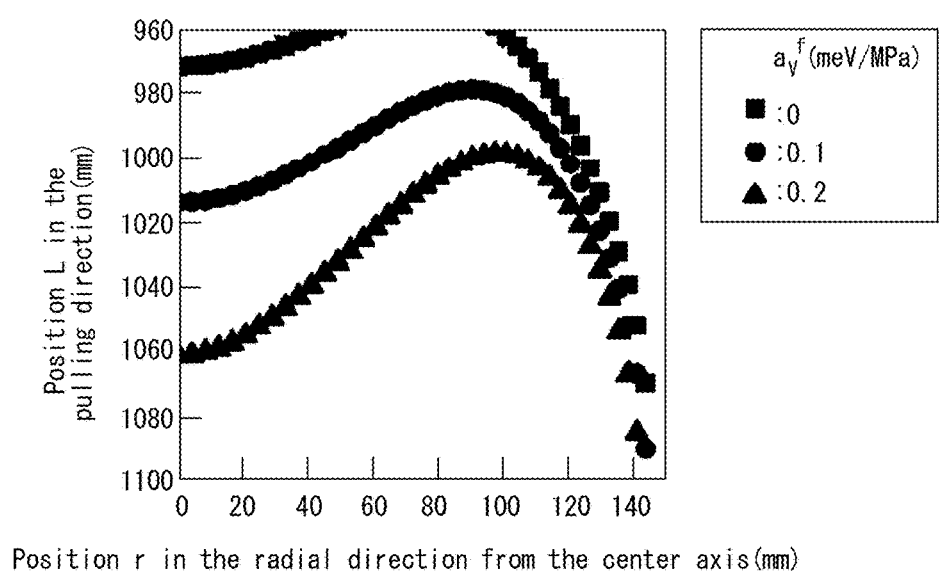
FIG. 5B is a diagram illustrating the relationship between the value of the stress coefficient and the profile of the boundary between the $P_I$ region and the L/DL region, found without considering the concentration of oxygen atoms.
Figure 5C:
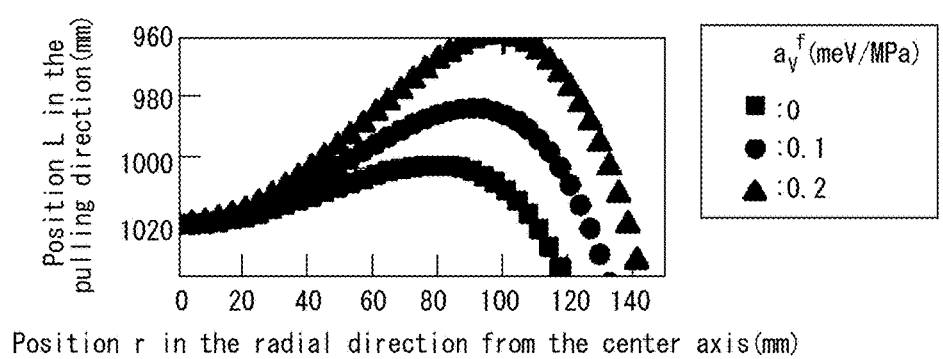
FIG. 5C is a diagram illustrating the relationship between the value of the stress coefficient and the profile of the boundary between the $P_I$ region and the L/DL region, found in consideration of the concentration of oxygen atoms.

This being the case, $C_{0,V}$ was found using the equation (18) such that in accordance with the value of $a_V^f$, the position of the boundary between the $P_I$ region and the L/DL region would coincide with the position in the experimentally obtained defect distribution depicted in FIG. 4A, as illustrated in FIG. 5C. With the positions of the boundaries being made to agree in the crystal center, $a_V^f$ was sought such that the peak position of the boundary between the $P_I$ region and the L/DL region coincide with the peak position in the experimentally obtained defect distribution depicted in FIG. 4A (the position of 980 mm in FIG. 5A). As a result, the value of $a_V^f$ was determined as 0.12. Thus, the values of the four stress coefficients $a_V^f$, $a_I^f$, $a_V^m$, and $a_I^m$ were determined, and the concentration profiles of vacancies and interstitial silicon atoms in the crystal were sought. The results are given in FIG. 4D.

Conventional Example

As with Example, the concentration profiles of vacancies and interstitial silicon atoms in a silicon single crystal were found and the defect distribution in the crystal was sought. Note that instead of the equations (6) to (9), the equations (6') to (9') for which the effect of stress was not taken into consideration were used. All the other conditions were the same to those in Example. The obtained defect distribution in the crystal is illustrated in FIG. 4B.

Comparative Example

As with Example, the concentration profiles of vacancies and interstitial silicon atoms in a silicon single crystal were found and the defect distribution in the crystal was sought. Note that of the four stress coefficients in the equations (6) to (9), for the values of $a_V^f$ and $a_I^f$, values found by the first principles calculation described in NPL 3 were used. All the other conditions were the same as those in Example. The obtained defect distribution in the crystal is illustrated in FIG. 4C.

Figure 4B:
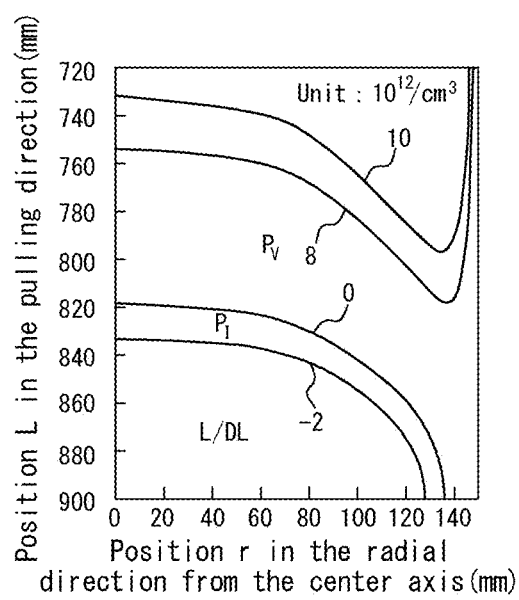
FIG. 4B is a diagram illustrating the distribution of defects in a crystal according to Conventional Example.
Figure 4C:
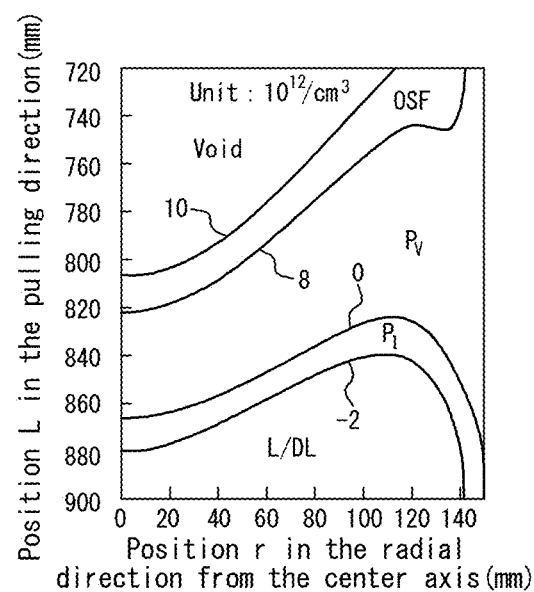
FIG. 4C is a diagram illustrating the distribution of defects in a crystal according to Comparative Example.

A comparison of FIG. 4A illustrating the experimental results with FIG. 4B to FIG. 4D illustrating the simulation results demonstrates that the position of the valley of the OSF region is too low, and the peak of the $P_I$ region is not reproduced in FIG. 4B corresponding to Conventional Example. Further, in FIG. 4C corresponding to Comparative Example, although the peak of the $P_I$ region is reproduced, the position of the value of the OSF region is too high. By contrast, in FIG. 4D corresponding to Example, the shapes of the OSF region and the $P_I$ region are well reproduced.

INDUSTRIAL APPLICABILITY

This disclosure provides determining the distribution of point defects in consideration of the thermal stress in a silicon single crystal and thus is useful in the semiconductor industry.

REFERENCE SIGNS LIST

1: Point defect simulator
11: Input unit
12: Display unit
13: Analysis unit
41: COP formation region
42: OSF potential nuclei region
43: Oxygen precipitation promotion region
44: Oxygen precipitation promotion region
45: Oxygen precipitation inhibition region
46: Dislocation cluster region

The invention claimed is:

1. A method of producing a silicon single crystal based on concentration profiles of vacancies and interstitial silicon atoms during pulling of a silicon single crystal by a Czochralski process, the concentration profiles being calculated using a convection-diffusion equation, the method comprising:

determining a concentration $C_V^{eq}$ of vacancies in thermal equilibrium represented by an equation (A) shown below and a concentration $C_I^{eq}$ of interstitial silicon atoms in thermal equilibrium represented by an equation (B) shown below in the convection-diffusion equation by fitting calculation results to experimental results by using as a fitting parameter, one of a first stress coefficient $a_V^f$ in the equation (A) and a second stress coefficient $a_I^f$ in the equation (B) and setting the other to be a fixed value obtained by a calculation approach, $$C_V^{eq}(T, P) = C_{0,V} \exp\left(-\frac{E_V^f + a_V^f P}{k_B T}\right), \text{ and} \tag{A}$$

-continued
$$C_I^{eq}(T, P) = C_{0,I} \exp\left(-\frac{E_I^f + a_I^f P}{k_B T}\right), \tag{B}$$

wherein in the equations (A) and (B), T is a temperature, P is a stress, $C_{0,V}$ and $C_{0,I}$ are constants, $k_B$ is the Boltzmann constant, $E_V^f$ is a formation energy of a vacancy, and $E_I^f$ is a formation energy of an interstitial silicon atom;

calculating the concentration profiles of each of the vacancies and the interstitial silicon atoms during the pulling of the silicon single crystal by the Czochralski process using the convection-diffusion equation for a design of a single crystal pulling apparatus;

repeating changing the design and calculating the concentration profiles of each of the vacancies and the interstitial silicon atoms for the changed design until a condition under which a defect-free silicon single crystal can be obtained is found;

manufacturing the single crystal pulling apparatus in accordance with the design which can produce a defect-free silicon single crystal; and producing a defect-free silicon single crystal using the manufactured single crystal pulling apparatus under the condition under which a defect-free silicon single crystal can be obtained.

2. The method of producing a silicon single crystal according to claim 1, wherein the designing of the single crystal pulling apparatus is designing size, shape, material, and relative positions of all or some of structures in the single crystal pulling apparatus that influences the thermal environment of the silicon single crystal being pulled up.

3. The method of producing a silicon single crystal according to claim 2, wherein the structures in the single crystal pulling apparatus include a heat shield and a water cooling means that surround the silicon single crystal being pulled up, a heater, a crucible, a heat insulating member placed around and under the heater, and a silicon melt in the crucible.

4. The method of producing a silicon single crystal according to claim 1, wherein the condition under which a defect-free silicon single crystal can be obtained is a range of pulling speed of the silicon single crystal.

5. The method of producing a silicon single crystal according to claim 2, wherein a solid-liquid interface between the silicon single crystal and a silicon melt has an upward convex shape.

6. The method of producing a silicon single crystal according to claim 1, wherein the silicon single crystal has a diameter of 300 mm or more.

* * * * *